United States Patent [19]
Peters et al.

[11] Patent Number: 5,285,206
[45] Date of Patent: Feb. 8, 1994

[54] PHASE DETECTOR FOR ELASTIC STORE

[75] Inventors: Richard W. Peters, Raleigh; William B. Weeber, Apex, both of N.C.

[73] Assignee: Alcatel Network Systems, Inc., Richardson, Tex.

[21] Appl. No.: 935,009

[22] Filed: Aug. 25, 1992

[51] Int. Cl.⁵ .............................................. H03M 9/00
[52] U.S. Cl. ...................................... 341/100; 341/61
[58] Field of Search ................................ 341/61, 100

[56] References Cited

U.S. PATENT DOCUMENTS

| | | | |
|---|---|---|---|
| 4,397,017 | 8/1983 | Rokugo | 370/102 |
| 5,030,951 | 7/1991 | Eda | 341/100 |
| 5,040,170 | 8/1991 | Upp et al. | 359/135 |
| 5,091,907 | 2/1992 | Wettengel | 370/102 |
| 5,157,655 | 10/1992 | Hamlin, Jr. et al. | 370/84 |
| 5,159,339 | 10/1992 | Fujita | 341/61 |
| 5,192,950 | 3/1993 | Stephenson, Jr. | 341/100 |

*Primary Examiner*—Marc S. Hoff
*Attorney, Agent, or Firm*—Bruce C. Lutz; Dennis O. Kraft

[57] ABSTRACT

A bit resolution phase detector can be realized for a parallel elastic store by comparing a write bit clock and a read bit clock to determine when stuff bits are required; upon detection of phase alignment between the write and read clocks, the phase detector will output a signal which will enable the insertion of a data bit into the stuff opportunity bit and cause the write clock to lag the read clock by one bit period.

5 Claims, 2 Drawing Sheets

| Ø DET | NF | NE | CONTROL |
|-------|----|----|---------|
| 0 | 0 | 0 | 0 |
| 0 | 0 | 1 | 1 |
| 0 | 1 | 0 | 0 |
| 0 | 1 | 1 | 0 |
| 1 | 0 | 0 | 1 |
| 1 | 0 | 1 | 1 |
| 1 | 1 | 0 | 0 |
| 1 | 1 | 1 | 0 |

PHASE DETECTOR FOR ELASTIC STORE

TECHNICAL FIELD

This invention relates to telecommunications and, more particularly, to an elastic store.

BACKGROUND OF THE INVENTION

A serial elastic store (one bit wide) is commonly used as a data buffer that is written into by one clock and read from by another. The elastic store adjusts the period of the data bit from that of the write bit rate to that of the read bit rate and absorbs the differences in the amount of data written into the elastic store and the amount of data read out to take care of short-term instabilities existing in the write and read clocks.

A phase detector may be used to compare the write and read addresses in order to cause data to be placed in a stuff opportunity bit location, as required.

However, a serial elastic store uses a high clock frequency, uses fairly complex circuitry and high power consumption.

DISCLOSURE OF INVENTION

An object of the present invention is to permit the reduction of circuit complexity and power consumption.

According to the invention, an effective implementation of an elastic store in parallel would accomplish this object, because it allows lowering the clock frequency, thereby reducing circuit complexity and power consumption.

In designing a mapping circuit having a parallel elastic store, the comparison of the write and read addresses, using the approach described above, would, for example, be done on a byte basis. However, comparing write and read addresses of an eight-bit parallel elastic store to determine when stuff bits are required would cause bursts of stuff bits to be inserted into the signal. This would be due to the fact that for a parallel elastic store, the write and read addresses would have only byte resolution. Such bursts of stuff bits will cause excessive jitter at a downstream desynchronizer.

Another object of the present invention is therefore to provide a simplified mapping circuit that uses low power and avoids excessive downstream jitter.

According to an embodiment of the present invention, for a parallel elastic store, the write bit clock and read bit clock are compared to determine when stuff bits are required.

In further accord with an embodiment of the present invention, a bit resolution phase detector for a parallel elastic store comprises a counter with a count enable to divide down the write clock, a counter to divide down the read clock, and a phase detector responsive to the so-divided write and read clocks for providing a stuff bit enable signal to a bit-stuffing multiplexer or variable shift register.

The phase detector will compare the write and read clocks and determine when the write and read clock signals are phase-aligned. Upon detection of phase alignment, the phase detector will output a signal which will (1) enable the insertion of a data bit into the stuff opportunity bit, and (2) cause the write clock signal to lag the read clock signal by one bit period. Since the elastic store will stuff a whole bit, there is only one bit of resolution in the phase detector; therefore, the signals being compared must have periods greater than one bit period. To obtain this, the write and read clocks are divided down and then input to the phase detector. The phase detector may be an edge detector, detecting the write clock signal (e.g., 44.736 MHz divided by 621) and the read clock signal (e.g. 51.84 MHz divided by 720).

The divisor of the counter generating the clock signals must be a multiplicand of the nominal number of bits in the stuffing frame. In a SONET DS3 napping, there are nominally 621 DS3 bits per row of the synchronous payload envelope (SPE). The SPE row is the equivalent of a stuffing frame, since there is one stuff bit opportunity per SPE row. The write clock counter shown below is a divide by 27 (3×3×3×23=621). When the phase detector enables the insertion of a data bit into the stuff opportunity location, this counter is disabled for one clock period, which has the effect of increasing the count by one and shifting the phase of the counter output by one bit. The reason for doing this is to adjust the count of the write counter to account for 622 bits, i.e., the nominal 621 bits plus the one data bit in the stuff opportunity bit location, being read out of the elastic store during that one row.

The read clock is generated by the read byte clock, which may, for example, be at 6.48 MHz (51.84 MHz divided by 8). The divisor of this counter may be 90 bytes per STS-1 row for a total of 720 STS-1 bits per row (720=90×8).

The present invention allows the elastic store to be implemented as a parallel elastic store having, for example, eight bits in parallel, which reduces circuit complexity and reduces the power consumption of an integrated circuit upon which the elastic store may be implemented. The only disadvantage is that it requires a separate near-full/near-empty detector on the elastic store.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
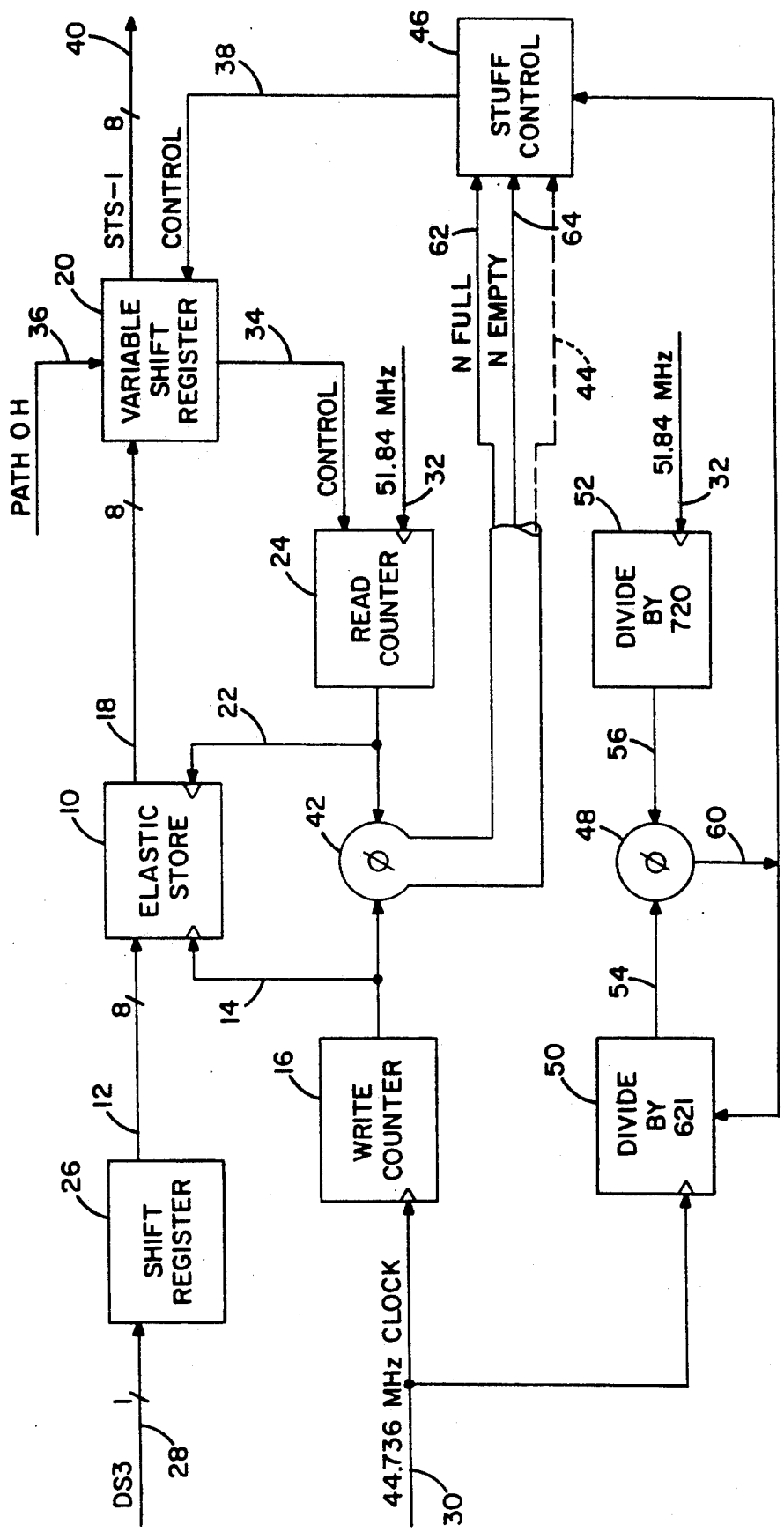
FIG. 1 shows a parallel elastic store (10) with a bit comparison phase detector, according to the present invention, for controlling stuff bits.

FIG. 1 shows an elastic store 10 responsive to an eight-bit data signal on a line 12 for storing the received eight bits in response to a write signal on a line 14 from a write counter 16 for a brief period and for subsequently providing a corresponding eight-bit output signal on a line 18 to a variable shift register 20 which may be a parallel-in/parallel-out bit stuffing multiplexer similar to that described in co-pending application Ser. No. 07/807,704, filed Dec. 16, 1991, which is hereby incorporated by reference. The data on the line 18 is read out in response to a read signal on a line 22 provided by a read counter 24.

The eight-bit data signal on the line 12 is provided by a shift register 26 which is in turn responsive to a serial DS3 level signal on a line 28, being a data stream provided at 44.736 Mbps. The function of the shift register 26 is simply to shift in data bits at the 44.736 MHz rate and output parallel bytes on the line 12 at a rate of 5.592 MHz. The write counter 16 is responsive to a 44.736 MHz clock signal on a line 30 derived from the DS3 signal on the line 28. The write counter 16 provides the write signal on the line 14 at the 5.592 MHz rate for storing the signal on the line 12 in the elastic store 10. The elastic store may be a first-in/first-out type storage medium and may have space for storing a small plurality of bytes, such as on the order of sixteen, being sufficient to absorb any short-term timing differences between the input and output.

The read counter 24 is responsive to a local 51.84 MHz clock signal on a line 32 and a control signal on a line 34 for providing the read signal on the line 22 at a gapped 6.48 MHz rate for reading out the signal on the line 18. The rate of reading data out of the elastic store is in bursts, which when averaged equals the data rate of the write data on the line 12, nominally 5.592 MHz, or 44.736 Mb/s. The gaps between the bursts of data read out of the elastic store are locations for stuff bits to be inserted into the data by the bit stuffing multiplexer 20.

The control signal on a line 34 from the variable shift register 20 provides an enable signal to the read counter 24 for the purpose of allowing the read counter to increment and therefore cause the elastic store to output bursts of data. The control signal on the line 34 would be the same or similar to the RXESRD signal shown in FIG. 8 of the above cited copending application Ser. No. 07/807,704.

The variable shift register 20 may be an eight-bit parallel-input-to-variable-bit-parallel-output shift register, responsive to the signal on the line 18, to a path overhead signal on a line 36 and to a control signal on a line 38 for providing an eight-bit parallel STS-1 level signal on a line 40 at a 6.48 MHz bit rate. The combination of the shift register 26, the elastic store 10 and the variable shift register 20 accomplish the napping of the DS3 level signal on the line 28 into an STS-1 signal on the line 40. The application shown may, but need not, simply be the packing of a DS3 signal directly into an STS-1, wherein the DS3 signal is treated simply as a 44.736 Mbps data stream with no implied internal structure. This mapping would be required for transparent transport of DS3-rate data streams.

Each row of a nine-row synchronous payload envelope (SPE) of the SONET STS-1 payload contains 87 (8)=696 bits, which can carry 621 or 622 DS3 data bits, depending on the value of the C-bits. The one stuff opportunity bit among the 696 contains information when the five C-bits are zero and a stuff bit when they are all ones. Asynchronous mapping for DS3 payload is described in American National Standard T1.105, which is hereby incorporated in its entirety by reference.

The write signal on the line 14 may be compared to the read signal on the line 22 in a phase comparator 42, which compares the phase of the signals on the lines 14 and 22 and outputs a signal on a line 44 that is indicative of the phase relationship. The signal on the line 44 is shown as a dashed line to indicate that this signal, according to the invention, is not used. It represents an approach that would have been taken, according to the prior art, in comparing the write counter and read counter for serial elastic stores. Because only bytes are written into and read out of the elastic store, according to an important teaching of the present invention, the phase detector 42 will be comparing write and read signals with coarser than one bit resolution. If the output of the phase detector 42 on the line 44 were used to control the variable shift register 20 by means of a stuff control 46 providing the control signal on the line 38, data would be placed in the stuff opportunity bit location in bursts. These bursts of extra data would cause excessive jitter on most desynchronizer designs. (The desynchronizer would be downstream from the variable shift register and would be responsive to the STS-1 signal on the line 40 for extracting the asynchronous DS3 signal from the SONET frame and for recovering the asynchronous clock for retiming the data.)

Since, in that case, the phase detector 42 would be comparing the elastic store write and read addresses, over byte boundaries, any frequency adjustments made via the stuff bit could occur only once one full byte of phase error would have built up. Thus, a burst of stuff bits would occur. This would be the prior art approach and therefore the signal on the line 44 is shown as a dashed line to indicate that such an approach, according to the present invention, should not be used.

This prior art approach can be improved, according further to the present invention, by using a phase detector 48, which compares the 44.736 MHz clock signal on the line 30 to the 51.84 MHz clock on the line 32. This may be done, as shown in FIG. 1, by means of a divide by six hundred and twenty-one circuit 50 and a divide by seven hundred and twenty circuit 52, respectively responsive to the 44.736 MHz clock on the line 30 and the 51.84 MHz clock on the line 32 for providing respective signals on lines 54, 56 for comparison in the phase detector 48.

The 51.84 MHz clock on the line 32 may be divided by seven hundred and twenty, the number of bits in one SPE row, to get exactly 72 kHz on the line 56, the frequency at which SPE rows repeat. If the DS3 maps six hundred and twenty-one data bits into an SPE row, then this will be done at the rate of 44.736 MHz divided by six hundred and twenty-one to give approximately 72 kHz on the line 54. The difference between these two frequencies is the equivalent of about one-third of a 44.736 MHz bit period per row. Thus, with nominal frequencies, the phase detector 48 will provide a stuff bit enable signal on a line 60 every third SPE row, which may be used by the stuff control 46, in conjunction with other signals to be described below, for providing the control signal on the line 38, which controls the insertion or lack of insertion of a data bit in the stuff opportunity bit in each row of the STS-1 signal on the line 40. The signal on the line 60 may also be used by the divide by six hundred and twenty-one circuit 50 for disabling the count for one period when the insertion of a data bit in the stuff opportunity bit is enabled. This will give the counter the equivalent of six hundred and twenty-two counts. In other words, when the count is disabled a data bit is being inserted into the stuff opportunity location and the counter 50 counts to the equivalent of six hundred and twenty-two. In the case where the circuit 50 is dividing a 44.736 MHz clock signal having an approximately twenty-two nanosecond period, this means that the signal on the line 60 will be used to disable the divide by six hundred twenty-one circuit 50 for one clock period, thereby extending its output by twenty-two nanoseconds. This has the effect of counting to six hundred twenty-two for one row for the purpose of accounting for the one data bit read out of the elastic store and placed into the stuff opportunity bit location. The phase detector 48 may be clocked by the 51.84 MHz clock.

The duty cycle and frequency of the output signal 54 of the +621 counter 50 determines the speed at which the phase detector 48 will detect phase alignment of the two signals 54 and 56 upon initial application of the 44.736 MHz clock on line 30 and the 51.84 MHz clock on line 32. The speed at which the phase alignment is detected is important because the circuit will be forcing abnormal insertion of the data bits into the stuff opportunity bit in order to align the phases; i.e., the circuit will either insert all data bits or all stuff bits instead of the nominal one data bit every third row from the time that both clocks are applied to the circuit until the phases are aligned. Abnormal insertion of the data bits into the stuff opportunity bit will cause excessive jitter in some of the downstream desynchronizers. Since the phase detector is clocked by the 51.84 MHz clock and can be designed to use the signal on line 56 to enable the sampling of the signal on line 54, the minimum duty cycle requirement is that the signal be active for one bit period and the minimum frequency requirement is the row rate, 72 kHz. The maximum time required to align the phases of the signals on lines 54 and 56 can be determined from the duty cycle and frequency of the signal 54 since it is known that the signal on line 54 will change in phase one-third of a 44.736 MHz bit period per row. If the divisor of the counter 50 is 621 and the duty cycle of the signal on line 54 is 50% and, as a worst case, the signals on lines 54 and 56 initially line up 180° out of phase, then the time to align will be 12.9 milliseconds (the amount the phase must move can be defined in bits, if the clock has a frequency of $\approx$72 kHz, then the period is one row or 621 bits, since the duty cycle is 50% and the signals are 180° out of alignment, then the phase must be moved half of the row period, or 310.5 bits; the phase moves one bit period for every three rows; the row rate is 72 kHz, thus the period of one row is $1/72$ $kHz$ seconds per row; therefore, the time to align=310.5 bits$\times$3 rows/bit$\times$1 $second/_{72E3\ row}$12.9 milliseconds). This time can be reduced only by increasing the frequency of the signal on line 54. The frequency of this signal must be an integer multiple of 44,736,000$\div$621 Hz; therefore, the counter 50 can be changed to any count to any multiplicand of 621 (3,9,23,27,69, and 207). In the implementation of this invention shown in FIG. 3, for example, the value of 27 was chosen for a counter 92. The $\div$27 counter is designed to output a signal which will be high for thirteen 44.736 MHz clock periods and low for fourteen 44.736 MHz clock periods; therefore, for this implementation of the circuit, the maximum time to align=0.58 milliseconds (=14 bits$\times$3 rows/bit$\times$1 $second/_{72E3\ row}$).

The stuff control 46 is not only responsive to the stuff bit enable signal on the line 60 in lieu of the prior art approach signal on the line 44, but also to a near-full signal on a line 62 and a near-empty signal on a line 64 from a sample circuit (not shown) associated within the phase detector 42. The near-full and near-empty signals may be provided by monitoring the lines 14 and 22 using the same method as the phase detector 42.

Figures 2, 3:
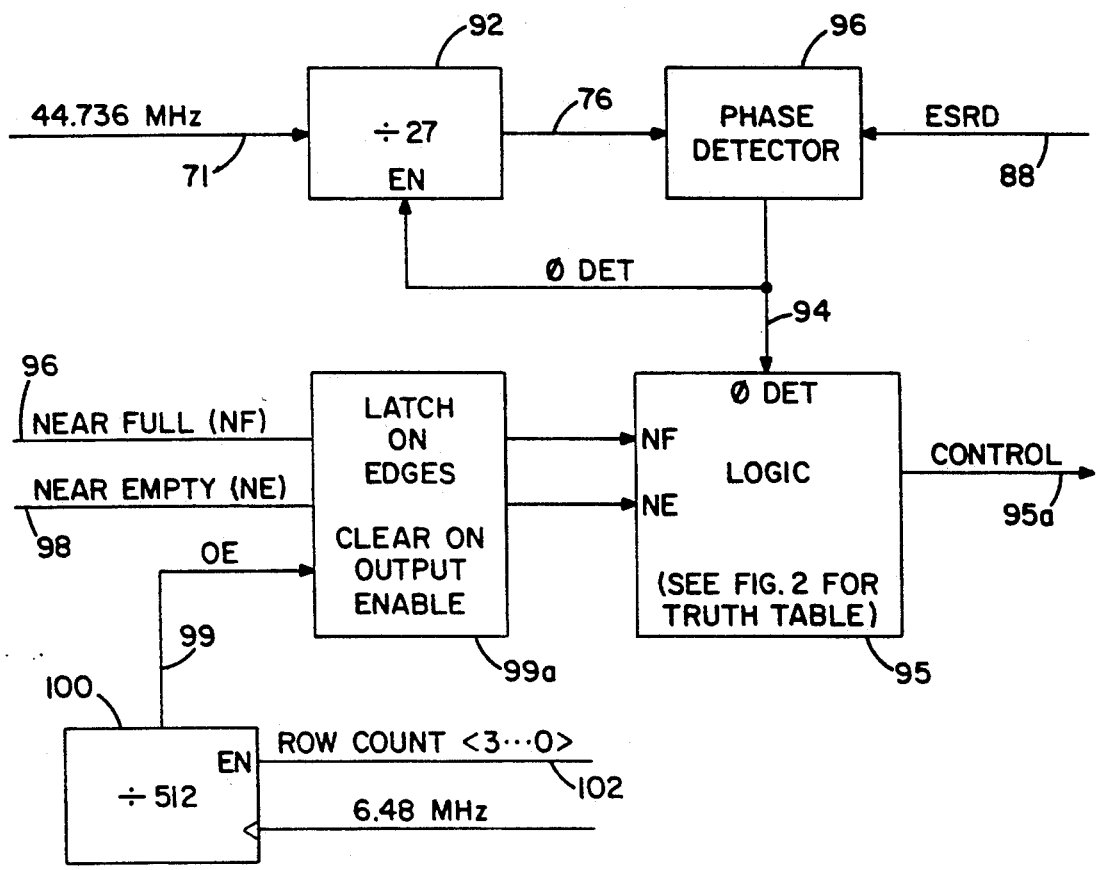
FIG. 2 shows a truth table, according to the present invention, for the stuff control of FIG. 1.
FIG. 3 shows a simplified counter arrangement, according to the invention.

The signals for the stuff control 46 of FIG. 1 are:

(1) The phase-detected signal on the line 60, where zero indicates insert data bit and one equals insert stuff bit, (2) the near-full signal on line 62, where zero equals don't care, and one equals forced data bit, (3) the near-empty signal on the line 64, where zero equals don't care and one equals forced stuff bit, and (4) the control signal on the line 38, where zero equals stuff bit equals data and one equals stuff bit equals stuff. The truth table for the stuff control 46 is shown in FIG. 2.

The data in the elastic store 10 should be centered within the elastic store for optimum operation. To be centered can be defined as the magnitude of the binary difference between the value of the write address on line 14 and the read address on line 22 be equal to one-half the size of the elastic store; i.e., if the size of the store is sixteen bytes, then for the data to be centered in the elastic store, the difference between the write and read addresses must equal 8 bytes. The values of the write and read addresses are not available to the phase detector 48 since it is separate from the elastic store 10, the write counter 16, and the read counter 24; therefore, a second circuit will be required to center the data in the elastic store. As previously explained, the phase detector 42 may have a near-full and near-empty threshold detector. This threshold detector determines if the data is centered in the elastic store by comparing the write address signal 14 with the read address signal 22. The threshold detector 42 outputs one of two signals 62, 64 to the Stuff Control 46 to indicate a threshold has been exceeded. Once the data has been centered in the elastic store, the action of the phase detector 48 will thereafter keep the data centered in the elastic store.

It is probable that the data will not be centered within the elastic store 10 upon application of the 44.736 MHz clock on line 30 and the 51.84 MHz clock on line 32 due to the fact that the write counter 16 and the read counter 24 will startup with a random value for the address signals 14 and 22; therefore, the output of the near-full and near-empty threshold detector 42 is required to move the data to the center of the store. Since the insertion of a data bit or stuff bit into the stuff opportunity location moves the data in the elastic store less than one bit, and the threshold detector has only a one byte resolution, it is reasonable to expect that the near-full and near-empty threshold can be exceeded for eight consecutive rows, or more. If the output of the near-full and near-empty threshold detector 42 were to control the insertion of data bits and stuff bits into the stuff opportunity location directly, the abnormal number of continuous data bits or stuff bits in the stuff opportunity location would cause excessive jitter to be output by some downstream desynchronizers. This problem can be overcome by gating the output of the near-full and near-empty threshold detector 42 with a timer to allow only a slow movement of the data back to the center of the elastic store. In the implementation of FIG. 3, the near-full and near-empty signals are gated with a 15.625 Hz signals (period=64 milliseconds) derived by dividing a signal on a line 102, active once an STS-1 frame (8 kHz), by 512.

To implement the stuff opportunity control circuit 46, signals on lines 96, 98 from a phase detector, e.g., a near-full detector and the near-empty threshold detector should be latched as shown in a latch 99a when they become active, held until sampled (at the POH column) and cleared by an output enable signal on a line 99 from a divide by 512 circuit 100, after being sampled.

A phase detector 96 of FIG. 3 would use an edge of a 72 kHz clock derived by dividing 51.84 MHz by 720 and named ESRD on a line 88 to sample the divide by 27 output signal on the line 76 for one clock every row (72 kHz). If the phase detector samples a logic 1 on the line 76, then the divide by 27 output rising edge is leading the sample point, and an enable stuff bit output on a line 94 would be zero, causing a data bit to be inserted in the S-bit location and the divide by 27 counter to be gapped for one count. This would cause the rising edge of the divide by 27 output to move in the direction of lagging the sample point.

Of course, a logic block 95 of FIG. 3 would have the same truth table of FIG. 2 as the stuff control 46 of FIG. 1 and will provide a control signal on a line 95a similar to the signal on the line 38 of FIG. 1.

If the phase detector 96 samples a logic 0, the divide by 27 output rising edge is lagging the sample point, and the enable stuff bit output would be one, causing a stuff bit to be inserted in the S-bit location. (The counters will not be gapped.) This will cause the rising edge of the divide by 27 output to move in the direction of leading the sample point.

At nominal frequencies, the enable stuff bit output 94 should be a repetitive 011 pattern.

As explained, in order to keep bursts of jitter from appearing at the downstream desynchronizer (not shown) outputs, near-full and near-empty signals on lines 96, 98 need to be gated by a counter 100 and allowed only once every 64 milliseconds, i.e., 512 frames. A frame sync pulse to enable the counter can be decoded from the row addresses on a line 102.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A mapping circuit for mapping a lower-speed serial signal (28) to a higher-speed parallel signal (40) organized in frames having plural rows of bits mapped from the lower-speed signal, the mapping circuit comprising:
   a shift register (26), responsive to the lower-speed serial signal (28) for providing the lower-speed signal as a converted parallel signal (12);
   a parallel elastic store (10), responsive to the converted parallel signal (12), for providing a high-speed signal in parallel (18);
   a bit stuffer (20), responsive to the high-speed signal (18) in parallel from the elastic store and responsive to a control signal (38), for controlling use of a stuff bit opportunity appearing at least once per row;
   a first divider (50), responsive to a bit clock (32) related to the lower-speed signal (28), for providing a first divided signal (54);
   a second divider (52), responsive to a bit clock (30) related to the higher-speed signal (40), for providing a second divided signal (56);
   a phase detector (48), responsive to the first and second divided signals (54, 56), for comparing their phases and for providing a stuff bit enable signal (60) in the presence of zero-phase difference therebetween; and
   a stuff control (46), responsive to the stuff bit enable signal (60), a near-full signal (62) and a near-empty signal (64), for providing the control signal (38) and wherein the bit stuffer (20) is responsive tot he control signal (38) for providing a stuff bit or a data bit in the higher-speed parallel signal (40) output therefrom.

2. The circuit of claim 1, further comprising a second phase detector (42), responsive to a write address signal (14) and to a read address signal (22) for providing the near-full and near-empty signals (62, 64).

3. The circuit of claim 1, wherein the first divider (50) is responsive to the stuff bit enable signal for disabling itself for one bit clock (30) period.

4. A method for mapping a lower-speed serial signal (28) to a higher-speed parallel signal (40) organized in frames having plural rows of bits mapped from the lower-speed signal, comprising the steps of:
   detecting a nominally periodic phase alignment between a write clock (30) quotient signal (54) and a read clock (32) quotient signal (56);
   providing an enable signal (60) in the presence of phase alignment to enable the insertion of a data bit into a stuff opportunity bit location in the higher-speed parallel signal (40); and
   causing the divided write clock (54) to lag the divided read clock (56) by one bit period of the write clock (30).

5. Apparatus for mapping a lower-speed serial signal to a higher-speed parallel signal organized in frames having plural rows of bits mapped from the lower speed signal, comprising:
   a phase detector (96), responsive to a write clock quotient signal (76) and a read clock quotient signal (88), for providing an enable signal (94) in the presence of phase alignment between the quotient signals (76, 88);
   a write clock divide circuit (92), responsive to a write clock (71) and to the enable signal (94), for providing the write clock quotient signal (76) and for causing the write clock quotient signal (76) to lag the read clock quotient signal (88) by one bit period of the write clock (71) in the presence of the enable signal (94); and
   logic means (96), responsive to the enable signal (94) and to a near full signal (96) and a near empty signal (98), for providing a control signal (95a) for controlling the insertion of a data bit into a stuff opportunity bit location in the higher-speed parallel signal.

* * * * *

UNITED STATES PATENT AND TRADEMARK OFFICE
CERTIFICATE OF CORRECTION

PATENT NO. : 5,285,206

DATED : February 8, 1994

INVENTOR(S) : Peters et al

It is certified that error appears in the above-identified patent and that said Letters Patent is hereby corrected as shown below:

Column 8, line 9, change "tot he" to --to the--.

Signed and Sealed this

Fourth Day of October, 1994

Attest:

BRUCE LEHMAN

Attesting Officer

Commissioner of Patents and Trademarks